June 21, 1960 D. R. MILLER ET AL 2,941,359
CONTROL SYSTEM CONTROLLING ONE OUTPUT VARIABLE
AND PROVIDING LIMITS FOR OTHER OUTPUTS
Filed Aug. 25, 1954 2 Sheets-Sheet 1

INVENTORS
DAVID R. MILLER
GEORGE BROWN
BY
ATTORNEY

INVENTORS
DAVID R. MILLER
GEORGE BROWN
BY- *Robert C Smith*
ATTORNEY

United States Patent Office 2,941,359
Patented June 21, 1960

2,941,359

CONTROL SYSTEM CONTROLLING ONE OUTPUT VARIABLE AND PROVIDING LIMITS FOR OTHER OUTPUTS

David R. Miller and George Brown, South Bend, Ind., assignors to Bendix Aviation Corporation, South Bend, Ind., a corporation of Delaware Filed Aug. 25, 1954, Ser. No. 452,029

13 Claims. (Cl. 60—39.28)

This invention pertains to control systems and more particularly to an electrical system for maintaining a controlled variable at a requested value subject to an overriding action when a second variable reaches a value beyond certain set limits.

In accordance with our invention variations in a primary variable condition, quality, or quantity are translated into an electrical signal which is a primary control factor in maintaining said variable within limits. A secondary variable condition is also sensed and changes therein are translated into electrical effects capable of overriding the first variable signal when the secondary variable reaches critical values. This invention is described broadly herein and also in connection with a particular application, i.e. a gas turbine control system, and it will be apparent that the system disclosed herein is capable of controlling many variables such as temperature, pressure, rate of fluid flow, displacement or other variables capable of being represented by an electrical value, subject to an override by a second variable which may become critical if allowed to drift outside certain limits. It is, therefore, an object of the present invention to provide a system capable of controlling a first quantity within close limits and providing an overriding control signal when a second quantity exceeds certain established values.

It is a further object to provide a control system in which overriding signals may be provided for as many variables as desired with no adverse effect in smoothness of operation.

Other objects and advantages will become apparent from the following specification and the accompanying drawings in which.

Figure 1:
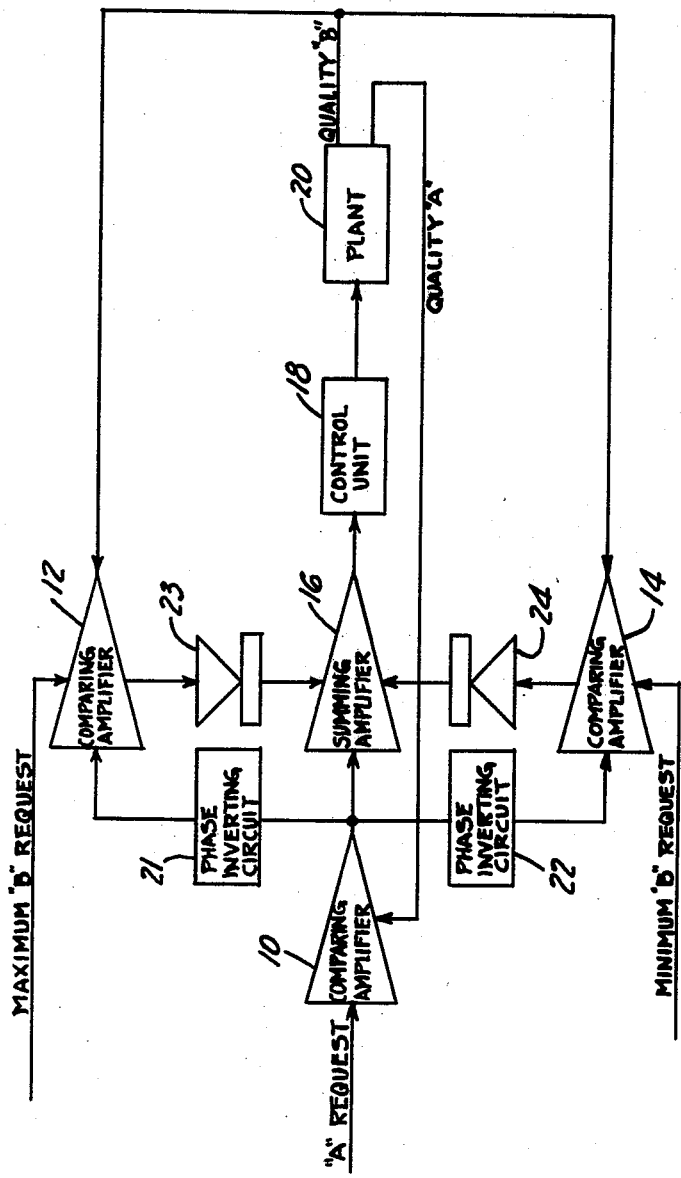
Figure 1 is a block diagram of the invention in its simpliest form without regard to the controlling variables.

Referring to Figure 1, a request or reference signal which may be a voltage proportional to a desired magnitude of a controlled variable is supplied to a comparing amplifier 10 the output from which is supplied to the two other comparing amplifiers 12 and 14 and to a summing amplifier 16. The output of amplifier 16 drives a control unit 18 which, in turn, governs the quantity or magnitude of whatever controlling factor is supplied to the plant 20. In plant 20 this controlling factor produces an effect upon the controlled variable. Two qualities A and B of the controlled variable are sensed in plant 20, electrical signals proportional to the magnitudes thereof being supplied to comparing amplifiers 10, 12 and 14. Assuming that the controlled variable must generally be held to a requested value of quality A and within established maximum and minimum limits of quality B, then the signal proportional to the sensed magnitude of quality A must be supplied to amplifier 10 and the signal proportional to quality B must be supplied to amplifiers 12 and 14. These sensed signals are of opposite polarity from their request or reference signals so that when combined in the amplifiers the resultant signal will be proportional in magnitude and polarity to the amount and direction of error respectively, of the quality sensed. Amplifiers 12 and 14 are supplied with reference signals corresponding to critical maximum and minimum values, respectively, for quality B, a sensed signal proportional to the magnitude of quality B, and also an A error signal from the output of amplifier 10 which has been subjected to a phase inversion in each of circuits 21 and 22. Referring particularly to amplifier 12 the B reference might be a comparatively high voltage representative of a maximum allowable value and the B sensed voltage somewhat lower signifying that the controlled variable in plant 20 is below the critical maximum. These voltages, when compared, produce a resultant signal of the same polarity as the B reference and which is, in turn, compared with a negative A error voltage from amplifier 10. This resultant signal, which reflects a value of quality B within the critical maximum, is blocked by a rectifying device 23 from reaching combining amplifier 16 and therefore has no effect upon control unit 18. Should the B signal from plant 20 be representative of a value beyond the critical maximum, it will override the B reference voltage, thus producing a resultant signal of opposite polarity to that in the example above. This signal is further augmented by being combined with the negative A error voltage as described above and the resultant, which is of proper polarity to pass rectifying device 23, is supplied to the combining amplifier 16. It will be noted that a positive A error voltage is also supplied to this amplifier. These two A error voltages cancel and the control unit 18 is supplied with a signal which is a function only of the critical value of quality B. This control unit will then correct the controlled variable until quality B is no longer critical. The loop including amplifier 14, phase invertor 22, rectifying device 24 and the combining amplifier 16 operates in the same manner as described above except that the B reference is representative of a critical minimum value rather than a critical maximum. The system described, then, controls the output of plant 20 to a requested value of quality A and maintains said output within critical maximum and minimum limits of quality B.

Figure 2:
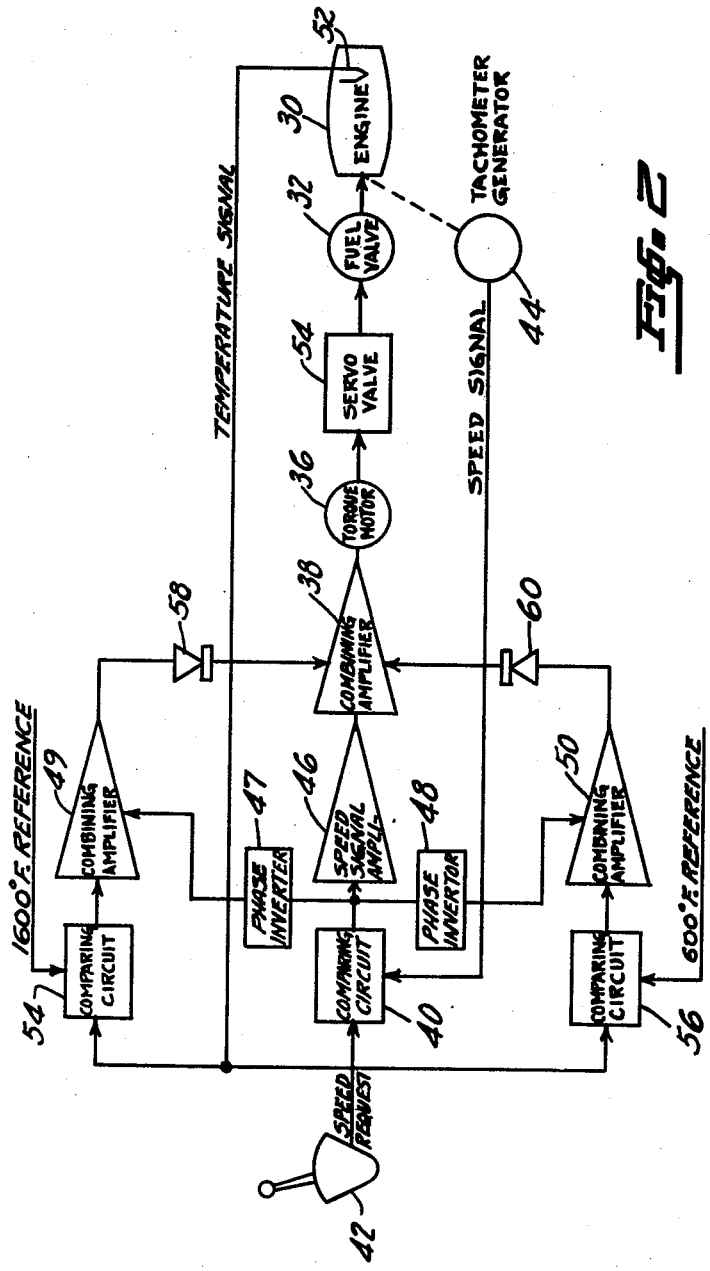
Figure 2 is a block diagram of the invention as adapted for use in a gas turbine fuel control system.

In Figure 2 is shown a block diagram of our control system as applied to a gas turbine engine 30. The parameters here under consideration are speed, which is the primary control function, and tailpipe or burner temperature, which is the secondary function. These parameters are both controlled by varying the amount of fuel supplied to the engine through valve 32. This valve is operated by a servo valve 34 which, in turn, is actuated by a torque motor 36. The signal for this torque motor is supplied by a combining amplifier 38. The speed request originates in a circuit 40 which is directly connected to a speed selector 42. The sensed speed signal is supplied by a tachometer 44 which is driven directly from engine 30. The tachometer and speed selector signals are compared in circuit 40 which has as its output the resultant speed error signal. This speed error signal is supplied to a speed amplifier 46 and, after being reversed in polarity in circuits 47 and 48 to temperature amplifiers 49 and 50. The temperature signal originates in a temperature sensing unit 52 which may contain one or more thermocouples and is supplied, as shown, to two comparing circuits 54 and 56. In circuit 54, the sensed temperature signal is compared with a temperature reference corresponding to a critical maximum value, in this case 1600° F. Circuit 56 compares a minimum temperature reference corresponding to 600° F. with the sensed temperature signal. The resultant temperature error signals are supplied to the temperature amplifiers 49 and 50 where they are compared with the speed error signal from circuit 40. The signal resulting from this comparison is supplied from amplifier 49 to rectifier 58 and from amplifier 50 to rectifier 60. Any output from either of these circuits is then fed to the combining amplifier 38. This system operates in the same manner as that described with relation to Figure 1. If the temperature signal is between 600° F. and 1600° F. the polarity of the signal supplied to the rectifiers 58 and 60 will be against the normal direction of conduction and no temperature signal will appear at combining amplifier 38. This leaves the engine 30 controlled entirely on speed. Should an under-temperature condition develop, however, the signal leaving comparing circuit 56 and, hence, temperature amplifier 50 will be of such polarity as to be conducted through rectifier 60 to combining amplifier 38. It will be noted that a signal from speed circuit 40 was supplied after suffering a phase inversion to temperature amplifier 50. This signal is conducted through rectifier 60 with the under-temperature signal and effectively cancels out the speed signal in amplifier 38 leaving the engine controlled entirely on temperature. This temperature signal, of course, is of such polarity as to represent a request for more fuel. Should an over-temperature condition exist, the upper branch as shown would operate in the same manner delivering a request for reduced fuel flow. In either case, the system controls on temperature only until the temperature sensor 52 indicates that the engine is again operating within the established temperature limits. As soon as this occurs the signals in the temperature amplifiers again are blocked by rectifiers 58 and 60 and the speed signal will control.

It is important to note that when the system makes the change to temperature error it is actually the algebraic sum of the temperature error and speed error signals which must have the proper polarity to be conducted through the rectifying devices. Therefore this transition may occur at a time when temperature error itself is still of such polarity as to indicate that operating temperature is within the established limit. As a result, control is on temperature before the actual temperature limit is reached, which provides temperature anticipation since the control now acts to reduce the rate of increase of fuel flow to control to the limit temperature.

We have disclosed herein a system for controlling a gas turbine engine with speed as a primary control function but within maximum and minimum temperature limits. We have also shown that our system is applicable in many situations wherein it is desired that a controlled variable be controlled primarily on the parameter "A" but within limits of a parameter "B." It is, of course, an obvious modification to control a variable primarily on one parameter and within limits on as many parameters as may be found to be critical. The additional parameters are incorporated into the circuit in a manner analogous to the temperature function discussed above. It may be determined that in a particular application only a maximum or a minimum value of a parameter is critical, in which case it would be necessary to employ only one of the limiting branches described above. This could be the case in an engine control where slight over-temperatures are dangerous but lower limits can be otherwise scheduled within acceptable accuracy.

We claim:

1. In a system for controlling a variable quantity as a function of a first parameter and within limits of a second parameter, means for creating an electrical reference signal proportional to a desired value of said first parameter, means for creating a signal proportional to the sensed value of said first parameter, means for creating a first error signal by comparing said reference and sensed signals, means for creating a second reference signal proportional to a critical maximum value of said second parameter, means for creating a third reference signal proportional to a critical minimum value of said second parameter, means for creating a signal proportional to a sensed value of said second parameter, a circuit for producing a second error signal by comparing said second reference signal with said signal proportional to said second parameter, a circuit for producing a third error signal by comparing said third reference signal with said signal proportional to said second parameter, a second error signal amplifier and a third error signal amplifier, means supplying said first error signal in inverted form to each of said error signal amplifiers, a combining amplifier and means for supplying said first error signal to said combining amplifier, a rectifier connected between said second error signal amplifier and said combining amplifier in such manner as to block all error signals from said amplifier except those representative of values in excess of said critical maximum, a second rectifier connected between said third error signal amplifier and said combining amplifier in such manner as to block all error signals from said amplifier except those representative of values below said critical minimum, actuating means driven by the output of said combining amplifier, and means driven by said actuating means for controlling said variable quantity.

2. In a system for controlling a variable quantity as a function of a first parameter and within limits of a second parameter, means for creating electrical signals proportional to the instantaneous values of said first and second parameters, means for creating an electrical signal proportional to a desired value of said first parameter, means for creating an electrical signal proportional to a critical maximum value of said second parameter, and means for creating an electrical signal proportional to a critical minimum value of said second parameter, a first circuit for producing a first error signal by comparing said signal proportional to the instantaneous value of said first parameter with said signal proportional to said desired value of said first parameter, second and third circuits for producing second and third error signals by comparing said signal proportional to the instantaneous value of said second parameter with each of said signals proportional to said critical maximum and minimum values of said second parameter, means supplying said first error signal in inverted form to said second and third circuits, a combining amplifier having connections to said first, second, and third circuits, a rectifier connected between said second circuit and said combining amplifier in such manner as to block all error signals from said circuit except those representative of values in excess of said critical maximum, a rectifier connected between said third circuit and said combining amplifier in such manner as to block all error signals from said circuit except those representative of values below said critical minimum, and means driven by said combining amplifier for controlling said variable quantity.

3. In a system for controlling a variable quantity as a function of a first parameter and within maximum and minimum limits of a second parameter, means for producing an electrical signal proportional to the difference between actual and desired values of said first parameter, means for producing a second signal proportional to the difference between the actual value of said second parameter and the maximum allowable value thereof, means for producing a third signal proportional to the difference between the actual value of said second parameter and the minimum allowable value thereof, means for combining said first signal in inverted form with said second and third signals, a combining amplifier having connections to each of said signal producing means, a rectifier connected between said second signal producing means and said combining amplifier in such manner as to block all signals from said means except those representative of values in excess of said maximum limit, a rectifier connected between said combining amplifier and said third signal producing means in such manner as to block all error signals from said means except those representative of values below said minimum limit, and means driven by said combining amplifier for controlling said variable quantity.

4. In a system for controlling the supply of fuel to a gas turbine engine primarily as a function of speed but within limits of engine operating temperature, a fuel valve, a tachometer for producing a signal proportional to instantaneous values of engine speed, temperature sensing means for producing a signal proportional to instantaneous values of engine operating temperature, a speed selector and means actuated by said speed selector for producing a speed request signal, a circuit for producing a speed error signal by comparing said tachometer signal with said speed request signal, means producing a maximum temperature reference signal and a circuit for comparing said reference signal with said temperature signal to produce a maximum temperature error signal, means producing a minimum temperature reference signal and a circuit for producing a minimum temperature error signal by comparing said minimum temperature reference signal with said temperature signal, an amplifier for amplifying each of said temperature error signals, means for supplying said speed error signal in inverted form to each of said amplifiers, an amplifier for amplifying said speed error signal, a combining amplifier having connections to each of said temperature amplifiers and to said speed amplifier, a rectifier connected between one of said temperature amplifiers and said combining amplifier in such manner as to block all error signals from said amplifier except those representative of values in excess of the maximum temperature reference, a second rectifier connected between the second of said temperature amplifiers and said combining amplifier in such manner as to block all error signals from said combining amplifier except those representative of values below said minimum temperature reference, and means driven by said combining amplifier for actuating said fuel valve.

5. In a system for controlling the supply of fuel to a gas turbine engine primarily as a function of speed and within limits of engine operating temperature, a fuel valve, means for creating an electrical reference signal proportional to a desired value of speed, means for creating a signal proportional to the sensed value of speed, means for creating a first error signal by comparing said reference and said sensed signals, means for creating a second reference signal proportional to a critical maximum value of engine operating temperature, means for creating a third reference signal proportional to a critical minimum value of engine operating temperature, means for creating a signal proportional to a sensed value of engine operating temperature, a circuit for producing a second error signal by comparing said second reference signal with said signal proportional to engine operating temperature, a circuit for producing a third error signal by comparing said third reference signal with said signal proportional to engine operating temperature, a second error signal amplifier and a third error signal amplifier, means supplying said first error signal in inverted form to each of said error signal amplifiers, a combining amplifier and means for supplying said first error signal to said combining amplifier, a rectifier connected between said second error signal amplifier and said combining amplifier in such manner as to block all error signals from said amplifier except those representative of over-temperature values, a second rectifier connected between said third error signal amplifier and said combining amplifier in such manner as to block all error signals from said amplifier except those representative of under-temperature values, actuating means driven by the output of said combining amplifier, and means driven by said actuating means for controlling the position of said valve.

6. In a system for supplying fuel to a gas turbine engine primarily as a function of turbine speed and within maximum and minimum limits of engine operating temperature, means for producing an electrical signal proportional to the difference between actual and desired values of speed, means for producing a second electrical signal proportional to the difference between the actual value of temperature and the maximum allowable value thereof, means for producing a third electrical signal proportional to the difference between the actual value of temperature and the minimum allowable value thereof, means for combining said first signal in inverted form with said second and third signal producing means, a combining amplifier having connections to each of said signal producing means, a rectifier connected between said second signal producing means and said combining amplifier in such manner as to block all signals from said means except those representative of over-temperature values, a rectifier connected between said combining amplifier and said third signal producing means in such manner as to block all signals from said means except those representative of under-temperature values, and means driven by said combining amplifier for controlling the supply of fuel to said engine.

7. In a system for controlling the supply of fuel to a gas turbine engine primarily as a function of speed but below a critical limiting value of engine operating temperature, a fuel valve, a tachometer for producing a signal proportional to instantaneous values of engine speed, temperature sensing means for producing a signal proportional to instantaneous values of engine operating temperature, a speed selector and means actuated by said speed selector for producing a speed request signal, a circuit for producing a speed error signal by comparing said tachometer signal with said speed request signal, means producing a temperature reference signal and a circuit for comparing said reference signal with said temperature signal to produce a temperature error signal, a temperature amplifier for amplifying said temperature error signal, means for supplying said speed error signal in inverted form to said amplifier, a speed amplifier for amplifying said speed error signal, a combining amplifier having connections to said temperature amplifier and to said speed amplifier, a rectifier connected between said temperature amplifier and said combining amplifier in such manner as to block all error signals from said temperature amplifier except those representative of values above of the critical limiting value of engine operating temperature, and means driven by said combining amplifier for actuating said fuel valve.

8. In a system for controlling a variable quantity as a function of a first parameter and below a critical limiting value of a second parameter, means for creating an electrical reference signal proportional to a desired value of said first parameter, means for creating a signal proportional to the sensed value of said first parameter, means for creating a first error signal by comparing said reference and sensed signals, means for creating a second reference signal proportional to a critical maximum value of said second parameter, means for creating a signal proportional to a sensed value of said second parameter, a circuit for producing a second error signal by comparing said second reference signal with said signal proportional to said second parameter, a first error signal amplifier and a second error signal amplifier, means supplying said first error signal in inverted form to the second error signal amplifier, a combining amplifier and means for supplying said first error signal to said combining amplifier, a rectifier connected between said second error signal amplifier and said combining amplifier in such manner as to block all error signals from said second error signal amplifier except those representative of values in excess of said critical maximum value, actuating means driven by the output of said combining amplifier, and means driven by said actuating means for controlling said variable quantity.

9. In a system for controlling a variable quantity as a function of a first parameter and below an established limit of a second parameter, means for creating electrical signals proportional to the instantaneous values of said first and second parameters, means for creating electrical signals proportional to a desired value of said first parameter and a critical value of said second parameter, a first circuit for producing a first error signal by comparing said signal proportional to the instantaneous value of said first parameter with said signal proportional to said desired value of said first parameter, a second circuit for producing a second error signal by comparing said signal proportional to the instantaneous value of said second parameter with said signal proportional to said critical value of said second parameter, means supplying said first error signal in inverted form to said second circuit, a combining amplifier having connections to said first and second circuits, a rectifier connected between said second circuit and said combining amplifier in such manner as to block all error signals from said circuit except those representative of values above said established limit of said second parameter, and means driven by said combining amplifier for controlling said variable quantity.

10. In a system for supplying fuel to a gas turbine engine primarily as a function of turbine speed and below a limiting value of engine operating temperature, means for producing an electrical signal proportional to the difference between actual and desired values of speed, means for producing a second electrical signal proportional to the difference between the actual value of temperature and the maximum allowable values thereof, means for connecting said first signal in inverted form to said second signal producing means, a combining amplifier having connections to each of said signal producing means, a rectifier connected between said second signal producing means and said combining amplifier in such manner as to block all signals from said means except those representative of over-temperature values, and means driven by said combining amplifier for controlling the supply of fuel to said engine.

11. In a system for controlling a variable quantity as a function of a first parameter and below a critical limiting value of a second parameter, means for producing a signal proportional to the difference between actual and desired values of said first parameter, means for producing a second signal proportional to the difference between actual value and said critical limiting value of said second parameter, means including a phase inverting means for combining said first signal in inverted form with said second signal, a combining amplifier having connections to each of said signal producing means, a rectifier connected between said second signal producing means and said combining amplifier in such manner as to block all signals from said means except those representative of values of said second parameter above said critical limiting value, and means driven by said combining amplifier for controlling said variable quantity.

12. In a system for controlling the supply of fuel to a gas turbine engine primarily as a function of speed and below a maximum limit of engine operating temperature, a fuel valve, means producing a speed error signal, means producing a temperature error signal proportional to the difference between a maximum temperature reference and the actual sensed temperature value, connections including a phase inverting means for combining said speed error signal in inverted form with said temperature error signal, an amplifier having connections to said speed error signal producing means and said combining means, a rectifier connected between said combining means and said amplifier in such manner as to prevent all error signals from reaching said means except those representative of an over-temperature condition, and means driven by said amplifier for actuating said fuel valve.

13. In a system for controlling a variable quantity as a function of a first parameter and above a critical limiting value of a second parameter, means for producing a signal proportional to the difference between actual and desired values of said parameter, means for producing a second signal proportional to the difference between actual value and said critical limiting value of said second parameter, means for combining said first signal in inverted form with said second signal, a combining amplifier having connections to each of said signal producing means, a rectifier connected between said second signal producing means and said combining amplifier in such manner as to block all signals from said means except those representative of values of said second parameter below said critical limiting value, and means driven by said combining amplifier for controlling said variable quantity.

References Cited in the file of this patent

UNITED STATES PATENTS

| | | |
|---|---|---|
| 2,606,420 | Moore | Aug. 12, 1952 |
| 2,623,354 | Best | Dec. 30, 1952 |
| 2,648,194 | Jorgensen et al. | Aug. 11, 1953 |
| 2,662,372 | Offner | Dec. 15, 1953 |
| 2,667,228 | Wood et al. | Jan. 26, 1954 |
| 2,697,908 | Offner | Dec. 28, 1954 |
| 2,707,866 | Noon et al. | May 10, 1955 |
| 2,720,751 | Kunz | Oct. 18, 1955 |

UNITED STATES PATENT OFFICE
CERTIFICATION OF CORRECTION

Patent No. 2,941,359            June 21, 1960

David R. Miller et al.

It is hereby certified that error appears in the above numbered patent requiring correction and that the said Letters Patent should read as corrected below.

Column 1, line 40, after "certain established values." insert the following paragraph:

> It is another object of the present invention to provide a control system capable of switching from one limiting parameter to another with a high degree of dependability and smoothness.

column 6, line 48, strike out "of", second occurrence.

Signed and sealed this 6th day of June 1961.

(SEAL)
Attest:

ERNEST W. SWIDER
Attesting Officer

DAVID L. LADD
Commissioner of Patents